(12) United States Patent
Vandine (10) Patent No.: US 7,636,981 B2
(45) Date of Patent: Dec. 29, 2009

(54) WINDSHIELD WIPER ARM WITH HEMMED DISTAL END

(75) Inventor: Jeff Vandine, Macomb, MI (US)

(73) Assignee: Concord Tool & Manufacturing, Inc., Mt. Clemens, MI (US)

( * ) Notice: Subject to any disclaimer, the term of this patent is extended or adjusted under 35 U.S.C. 154(b) by 224 days.

(21) Appl. No.: 11/248,818

(22) Filed: Oct. 12, 2005

(65) Prior Publication Data

US 2007/0079463 A1    Apr. 12, 2007

(51) Int. Cl.
*B60S 1/34*    (2006.01)
(52) U.S. Cl. ................................. 15/250.351
(58) Field of Classification Search ............ 15/250.351, 15/250.352, 250.04, 250.21
See application file for complete search history.

(56) References Cited

U.S. PATENT DOCUMENTS 4,932,097 A * 6/1990 Kobayashi et al. ....... 15/250.34
6,473,932 B1 * 11/2002 Igarashi ................. 15/250.351
6,505,377 B1    1/2003 Merkel et al.
6,732,401 B2    5/2004 Rapp
6,742,216 B2 * 6/2004 Zimmer et al. ......... 15/250.351

* cited by examiner

*Primary Examiner*—Gary K Graham
(74) *Attorney, Agent, or Firm*—VanOphem & VanOphem, P.C.

(57) ABSTRACT

A wiper arm for a wiper assembly of an automotive vehicle, the wiper arm being formed in a single piece from a metallic blank and having an inner end portion of generally U-shaped configuration in cross-section that is formed by drawing the blank in a progressive die, and an outer end portion that is formed with a C-shaped configuration in cross-section, by hemming. The outer end portion has a central portion with edge portions that are reversely folded to underlie the central portion, edges of the edge portions being disposed in close proximity to one another. An end portion of the outer end portion of the wiper arm is reversely folded to be spaced from and underlie a portion of the outer end portion thereabove, and the end portion is provided with an opening by which a wiper blade may be attached to, or removed from, the wiper arm.

4 Claims, 7 Drawing Sheets

WINDSHIELD WIPER ARM WITH HEMMED DISTAL END

CROSS REFERENCE TO RELATED APPLICATION

Not Applicable

FEDERALLY SPONSORED RESEARCH OR DEVELOPMENT

Not Applicable

REFERENCE TO SEQUENCE LISTING

Not Applicable

BACKGROUND OF THE INVENTION

1. Field of the Invention

This invention relates to a wiper arm for an automotive windshield wiper system. More particularly, this invention relates to a wiper arm of the aforesaid character of unitary construction with a narrow, thickened free or distal end of a double thickness that is formed by hemming.

2. Description of the Prior Art

Figure 2:
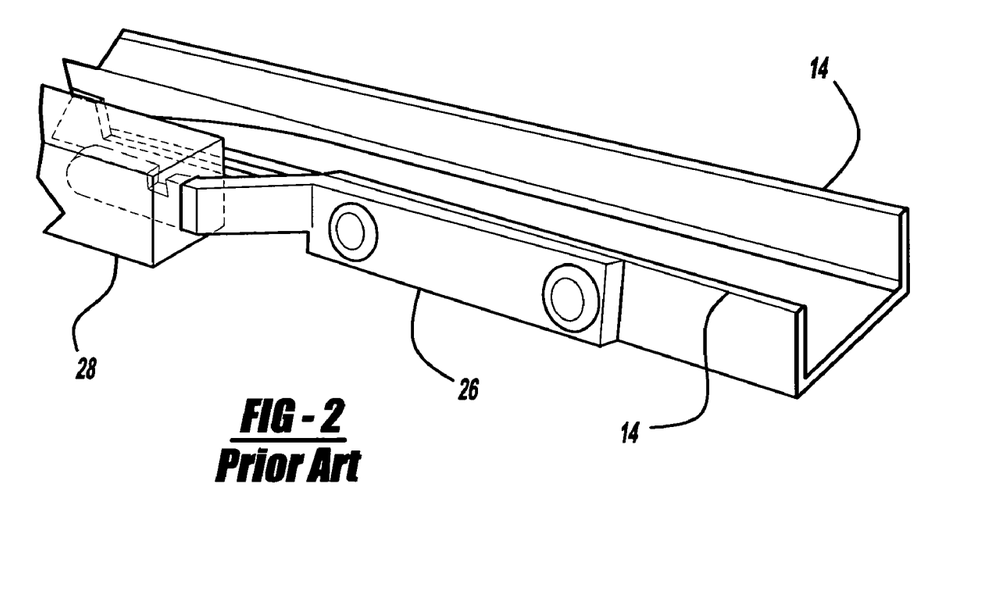
FIG. 2 is a partial view of the prior art wiper arm assembly shown within Circle 2 of FIG. 1.
Figure 3:
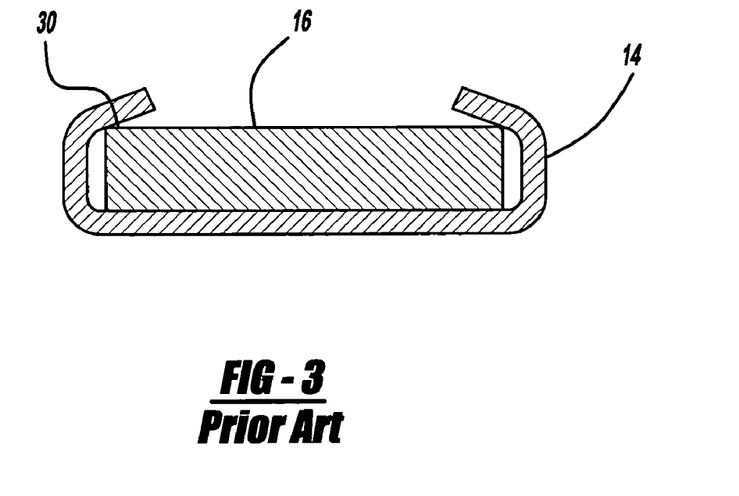
FIG. 3 is an cross-sectional view of the prior art wiper arm along lines 3-3 of FIG. 1.
Figure 4:
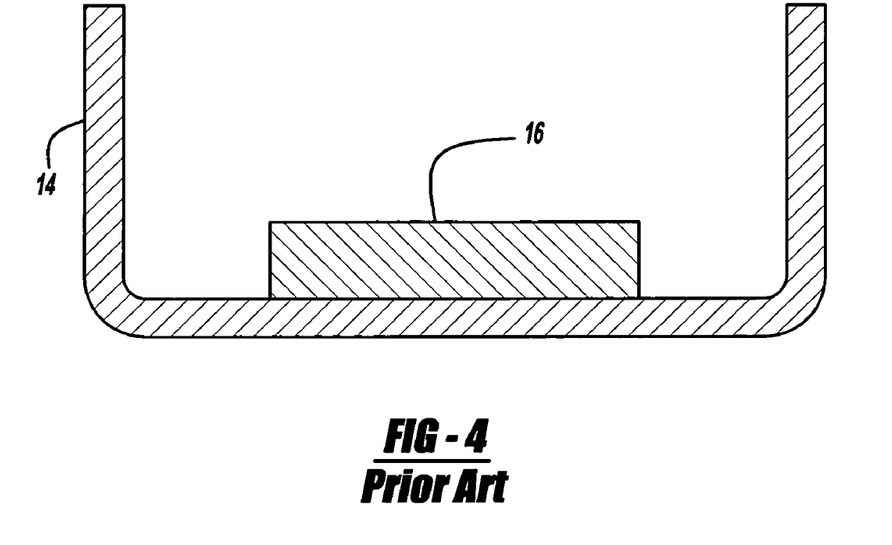
FIG. 4 is a cross-sectional view of the prior art wiper arm taken along line 4-4 of FIG. 1.
Figure 5:
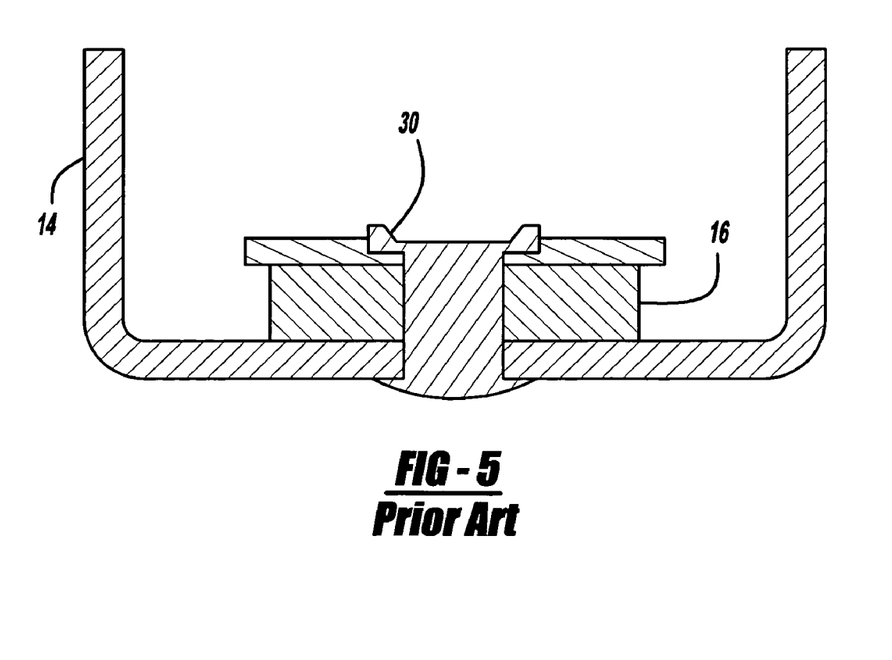
FIG. 5 is a cross-sectional view of the prior art wiper arm taken along line 5-5 of FIG. 1.

Typical prior art windshield wiper arm assemblies 10 used on motor vehicles as shown in FIGS. 1 through 5 normally consist of a mounting head 12, retainer arm 14 and wiper or arm rod 16, as well as, a tension or a coil spring 20. The mounting head 12 is typically manufactured of zinc or aluminum die cast. Typically the retainer arm 14 is formed from sheet metal and stamped in a general U-shaped configuration as shown in FIGS. 4 and 5. The windshield wiper arm assembly 10 also has a wiper blade (not shown), which has a support bracket system and wiper strip retainer (not shown). The wiper blade is pivotally connected to the windshield wiper arm assembly 10 through use of a hook like end 17 of the wiper rod 16 which engages between two lateral cheeks of the support bracket system of the wiper blade (not shown). The fit with the support bracket requires a sizing operation on the width of the hook like end 17 so that it will properly fit between the two lateral cheeks of the support bracket it engages. The connection thus formed guides the wiper blade with the wiper strip over the glass windshield of the motor vehicle. The jointed connection and the support bracket system make it possible for the wiper strip to adapt to a curvature of the windshield. A required contact pressure of the wiper strip on the vehicle windshield is attained with at least the tension coil of the spring 20 which braces the mounting head 12 and the retainer arm 14 in conjunction with the wiper rod 16 through a toggle joint 21.

The shape of the individual components of the retainer arm 14 is influenced by various demands and stresses. Specifically, they should be as torsionally rigid, deflection-resistant, and as narrow in the field of view as possible, so that the wiper blade can be guided without vibration and under control over the vehicle windshield yet present little hindrance to the field of view. The mounting head 12 transmits the drive moment from the drive axis A-A to the wiper blade, via the retainer arm 14 and the arm rod 16. It also forms part of the toggle joint 21, by way of which the mounting head 12 is braced with the retainer arm 14 by the tension spring 20 and pressed in the direction of the vehicle window. The greatest forces or moments arise in the mounting head 12, both parallel to the window and perpendicular to the window. Further, deformations in the lower region of the retainer arm 14 have an especially strong effect over the entire length and can cause uneven wiping speeds as a result of a spring effect. The mounting head 12 and the first portion of the retainer arm 14 must therefore be embodied as especially deflection-resistant and torsion-resistant.

In a wiping motion, the outward portion of the retainer arm 14 moves partly, and the wiper or arm rod 16 moves completely, through the field of view of the driver and as a result they must be made not only torsion and deflection resistant, but also especially narrow so that they impede as little of the driver's view as possible. Further, the retainer arm 14 should be shaped in such a way that it is not lifted away from the vehicle window by the air flow across the windshield.

To accommodate these various requirements, prior art windshield wiper arm assemblies 10 have a wide mounting head that may be made of zinc or aluminum die cast or sheet metal as well as a retainer arm 14 that is also made of sheet metal which is relatively wide in the region of the mounting head 12 that is, at the lower edge 22 of the field of view of the driver. Often, this portion of the retainer arm 14 is made with an inverted U-profile that is open towards the window as shown in FIG. 5. Such profile has a relatively strong resistance moment, and is especially torsion and deflection resistant in this area while also being able to accommodate the tension spring 20 which is concealed in the U-profile. In the outward direction towards the free arm end of the retainer arm 14 where the retainer arm 14 connects with the wiper rod 16, the retainer arm 14 tapers so that it is narrower in the field of view of the driver as shown in the cross-section of FIG. 3. Over the full length of the retainer arm 14, the profile has a constant material thickness, determined by the sheet metal thickness used. This thickness is designed in order to accomplish the appropriate dimensional stability under the greatest material stresses to be expected which are basically bending and torsion stresses, specifically, perpendicular and parallel to the vehicle window.

Figure 1:
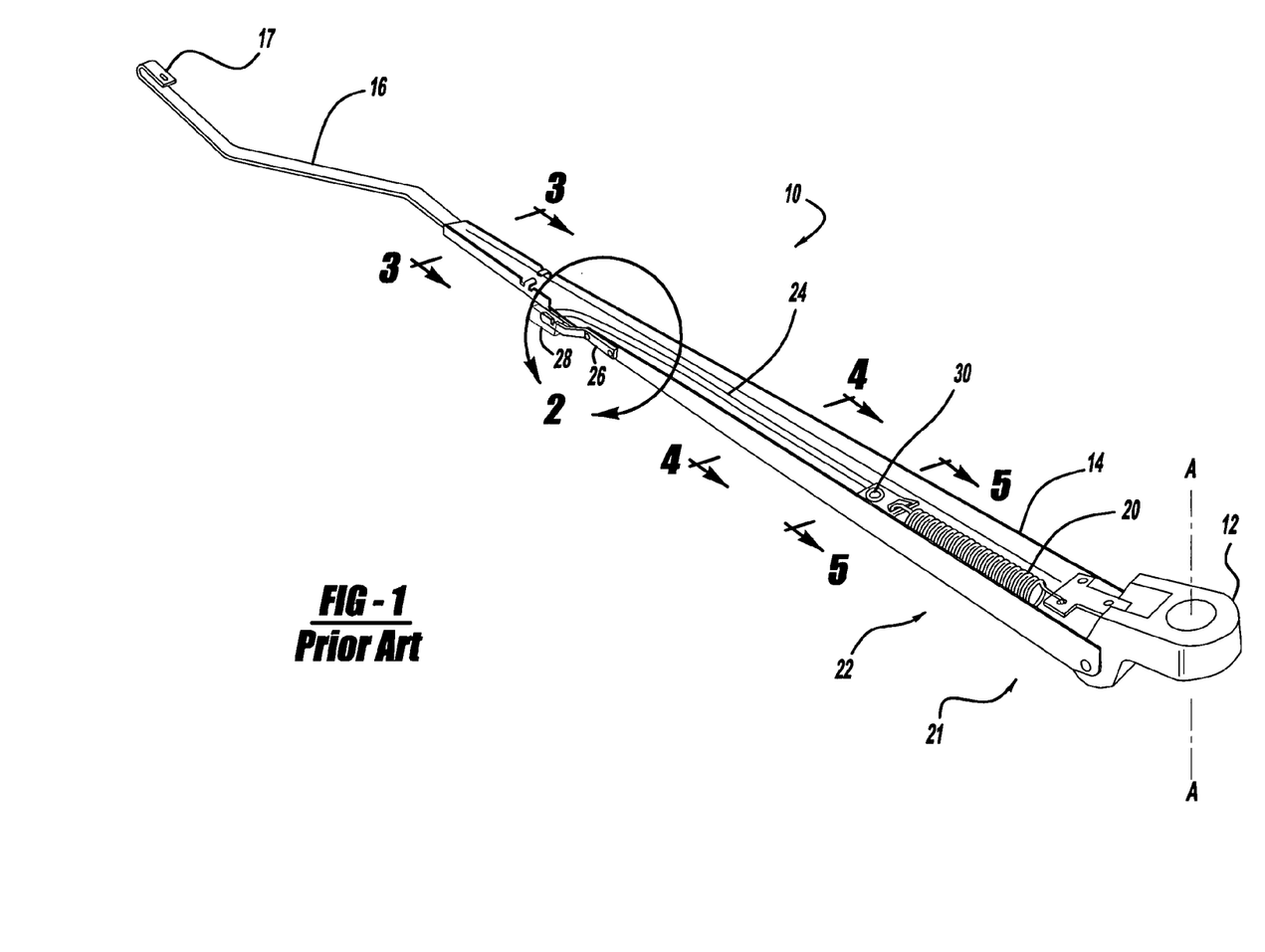
FIG. 1 is a plan view of a prior art construction of a windshield wiper arm assembly.

Generally, the wiper rod 16 is formed of a profile of constant thickness material solid flat stock, which is either crimped or riveted 30 as shown in FIGS. 1 and 3 to the retainer arm 14. The thickness of the wiper rod 16 is a function of drive and contact forces, the length of the retainer arm 14, as well as the resistant moments to the windshield wiper arm assembly 10. Further considerations are the effect of wind engagement faces as well and more importantly, the slender structure in the field of view of the driver. Generally, the material stress demands are greatest at the connection point of the wiper rod 16 to the retainer arm 14 and because of the small cross-sectional area and unfavorable resistance moments, the material thickness is generally determined by the stress requirement at the connection point between the retainer arm 14 and the wiper rod 16. For this reason, the wiper rod 16 itself is generally a solid stock formed of a thicker material than the retainer arm 14 thus, the arm rod 16 and retainer arm 14 are combined in a single rigid assembly which rotates a limited degree about drive axis A-A. As a result, in some applications, there is unnecessarily high consumption of material, high material costs, and high weight.

Further considerations to be made in the design of a complete windshield wiper system is the associated windshield washing system and considerations which need to be made with respect to the mounting of the spraying device on the hood or the windshield wiper arm assembly 10. The windshield washing system consists of a washing liquid reservoir, as well as a pump (not shown), by which washing liquid is sprayed onto the windshield to be cleaned by a spraying device. It is known that the spraying device may be stationarily arranged on the engine compartment hood. Further, the windshield cleaning system-spraying device maybe fixed to the windshield wiper arm assembly 10. The advantage of fixing the spraying device to the windshield wiper arm assembly 10 is that the washing liquid is sprayed immediately in front of the wiper blade. In the prior art embodiment illustrated in FIGS. 1 through 5, the mounting bracket 26 for attaching a spraying or washer nozzle 28 is riveted to one of the legs of the U-shaped retainer arm 14. In some prior art embodiments the mounting bracket 26 may be stamped out of the profile of the U-shaped leg of the retainer arm 14 and laterally spaced with respect to the plane of the leg of the U-shaped retainer arm 14. This attached structure provides a very stabile, rigid mounting surface for the spraying nozzle 28 which provides an attractive, compact assembly in which the fluid line or hose 24 can be dressed substantially entirely within the cavity of the U-shaped retainer arm 14 and thereby be out of sight from the user.

With reference to prior art FIG. 2, the details of the spraying or washer nozzle 28 are illustrated. The washer nozzle 28 includes a body portion and a mounting flange integrally formed therewith for mounting washer nozzle 28 with mounting bracket 26. The fluid line 24 is connected to an inlet nipple to provide washer fluid to an inlet port. As a result, a spray or mist is expelled from a nozzle port of the outlet nipple.

In order to solve high cost and high weight problems, some windshield wiper assemblies particularly teach the use of a retainer arm and wiper rod which can be made of a number of variable material layers which are folded upon one another in various regions until the material thickness required for the particular cross-section is obtained. A thin material is bent over multiple times by approximately 180° in multiple steps in order to brace each layer. The advantage, of course, is from a relatively thin sheet of metal, different material thickness can be obtained in different regions and this thickness can be adapted exactly to different stresses that arise. Unfortunately, small material stress cracks, virtually invisible to the eye, can result from these multiple bending operations and as a result, such minute cracks, if they occur on the outer surfaces, can cause excessive noise by wind passing thereover when exposed to a high wind stream. Further, obviously, the multiple layers of metal in order to accomplish the appropriate size requirements, may also result in higher material costs as well as higher weights due to the multiple layers which are necessary in order to provide the appropriate structural rigidity for the torsion and deflection forces that are known in selective areas of the windshield wiper assembly. Generally, to enable the use of multiple layer assemblies, a thinner material is used in order to make the multiple folds which are necessary to acquire the particular cross-section needed to resist the known deflection and torsion moments.

U.S. Pat. No. 6,505,377 B1 (Merkel et al.) discloses a wiper arm or wiper rod, element 18, for a windshield wiper assembly, the wiper rod being formed from multiple layers of a single thickness component sheet of metal (column 2, lines 30-39). The free or distal end of a one-piece wiper rod according to this reference is formed with four thicknesses of metal by a stamping operation, FIG. 8, presumably to provide the wiper rod with adequate stiffness to resist deflection or tension stresses under aerodynamic load, to thereby maintain a wiper blade that is attached to the free end in contact with an adjacent windshield and without requiring an excessive wiper rod width at the outer region, which is in the field of vision of an operator of the associated motor vehicle. A known problem with the FIG. 8 configuration of the wiper arm or rod of this reference is that the number of bends as a result of stamping of the metal strip in order to achieve this configuration, requiring a 180° bend at the location of the lower detent holes (elements 56), in addition to four 90° bends to achieve such configuration, can introduce cracking in outer surface layers of the metal. Such surface configuration is undesirable because it can lead to excessive noise in the associated vehicle when the vehicle is traveling at highway speeds.

The '377 reference also discloses an alternative embodiment, the embodiment of FIGS. 9-16, in which the free or distal end of the wiper rod is formed by a stamping operation in a triple thickness, as shown in FIG. 14, which also requires severe bends on each of the ends of the blank from which the rod is formed, following a 90° bend in advance of each 180° bend. The FIG. 14 embodiment of the invention of the '377 reference, of necessity, will require a thickness sufficient to accommodate three (3) layers of material, and it will require extra width of the blank from which the wiper rod is formed to provide this triple thickness construction. The multiple layer assembly is not cost effective because of the additional processing steps to generate the various bends and the resultant higher weight due to the multiple layers of metal.

U.S. Pat. No. 6,732,401 B1 (Rapp), which shows an assignment to the same assignee as the '377 patent, shows, in FIGS. 3 and 5, a wiper arm assembly in which the free end has an open or box type cross-section, presumably for added rigidity in this region. The use of a box-type configuration in this region adds to the required thickness of the rod or arm at a location in the field of view of the driver, which, at the least, serves as an annoyance to the driver and is, in any case, aesthetically unattractive. Again, such configuration is not economical and requires additional processing steps to obtain the various material thickness configuration of the hook like end 21.

BRIEF DESCRIPTION OF THE INVENTION

The aforesaid and other problems associated with prior art wiper arm constructions are avoided by a wiper arm constructed according to the present invention that is fabricated from a single thickness blank of a suitable material. An inner portion of the wiper arm, which is generally U-shaped in cross-section, is formed by a drawing operation in a progressive die. An outer portion of the wiper arm is formed by hemming into a double thickness, a generally C-shaped configuration with no spacing between a single thickness layer of material of the arm and an in-turned pair of material edges that extend from opposite sides of the single thickness layer. Such a configuration has sufficient resistance to deflection and torsional moments under aerodynamic loads to maintain a wiper blade attached to the distal end of the wiper arm in engagement with an adjacent windshield, it is sufficiently narrow at the distal end to avoid undue visual interference to an operator of an associated vehicle, and it is sufficiently thin in a transverse direction to be aesthetically clean and visually undistracting. The wiper arm of the present invention is also lower in weight than known prior art wiper arm constructions, it is relatively inexpensive to produce due to it's single piece construction, and it incorporates a more accurately positioned hole in a reverse turned hook end for accurate attachment of a wiper blade to the wiper arm itself without the need of a resizing operation to fit the hook like end between the cheeks of the support bracket it engages. Further, the mounting bracket for attachment of the spray nozzle is formed from the extended portion of the U-shaped legs of the retainer arm so that no additional parts or assembly operations are required to attach this mounting bracket because additional material is provided in the original blank that is carried through the progressive die.

Accordingly, it is an object of the present invention to provide an improved, economical, light weight wiper arm for a windshield wiper assembly that is fabricated from a single thickness blank of a suitable material, that has a free or distal end that is narrow in the line of sight of an operator of an associated vehicle, that is both thin in a transverse direction and is provided with sufficient resistance to deflection and torsion moments under aerodynamic load, and can be made free of cracks and other surface irregularities that would otherwise be noisy when the associated vehicle is driven at highway speeds.

It is a further object of the present invention to fabricate an improved wiper arm for a windshield wiper assembly that is economical to manufacture by hemming the wiper rod portion of the retainer arm and provide additional material in the single piece blank to enable fabrication of the mounting bracket for the attachment of the spray nozzle out of the single piece blank.

For a further understanding of the present invention and the objects thereof, attention is directed to the drawing and the following brief description thereof, to the detailed description of the invention and to the appended claims.

DETAILED DESCRIPTION OF THE PREFERRED EMBODIMENT OF THE INVENTION

Figure 6:
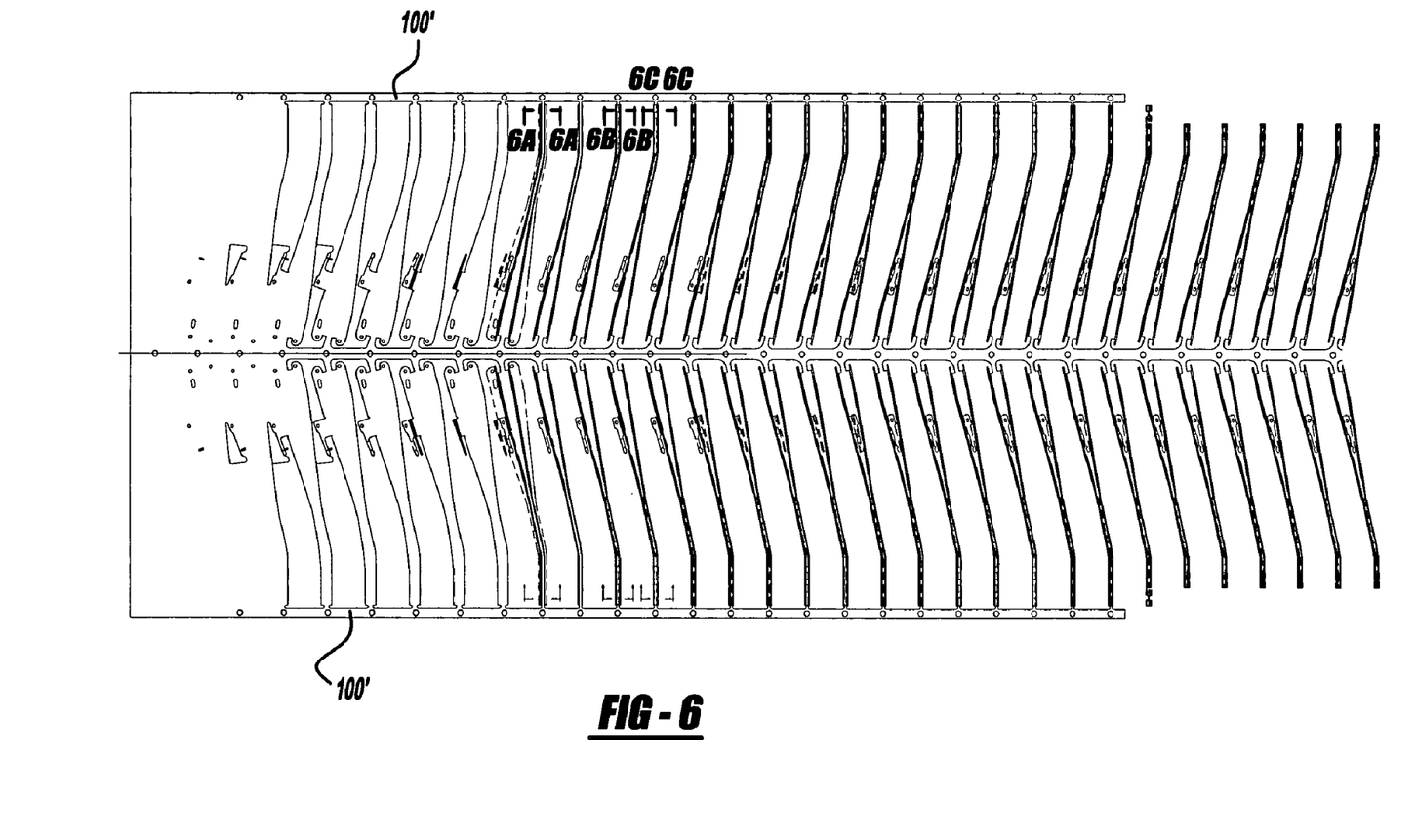
FIG. 6 is a plan view of a blank strip for a progressive die from which the wiper arm according to the present invention is fabricated.
Figure 6A:
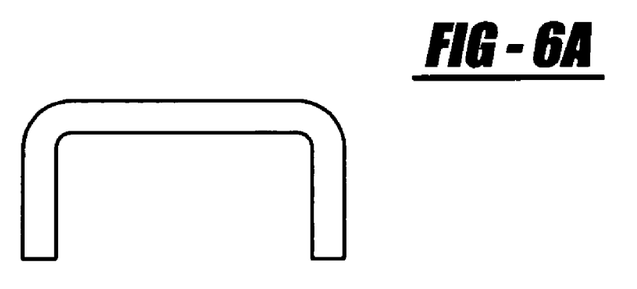
FIG. 6A is a cross-sectional view taken along line 6A-6A of FIG. 6.
Figure 6B:
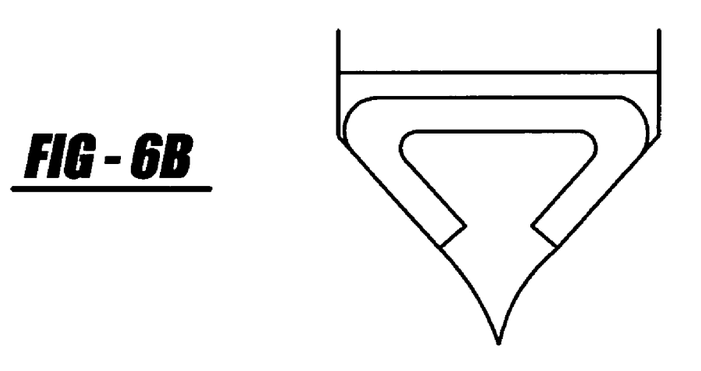
FIG. 6B is a cross-sectional view taken along line 6B-6B of FIG. 6.
Figure 6C:
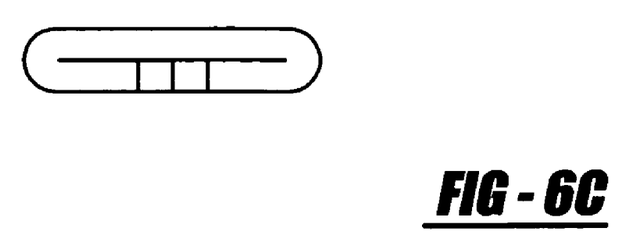
FIG. 6C is a cross-sectional view taken along line 6C-6C of FIG. 6.
Figure 7:
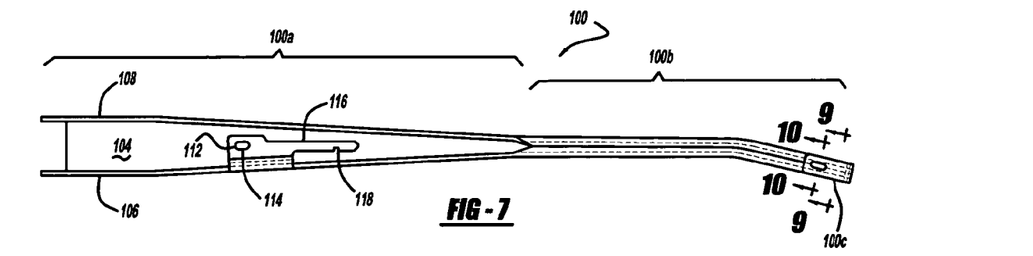
FIG. 7 is a bottom plan view of a single piece wiper arm according to the present invention after it has been fabricated from the blank strip of FIG. 6.
Figure 9:
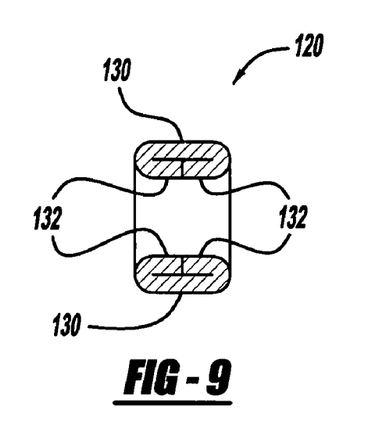
FIG. 9 is a cross-sectional view rotated 90° taken along line 9-9 of FIG. 7.
Figure 10:
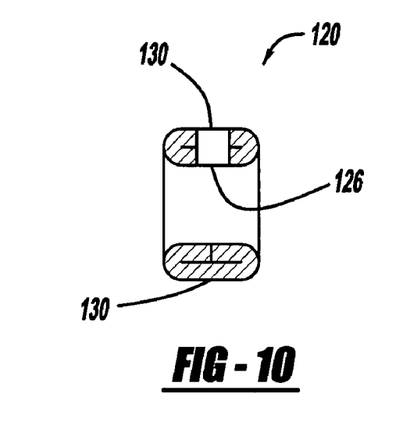
FIG. 10 is a cross-sectional view, rotated 90°, taken along line 10-10 of FIG. 7.
Figure 11:
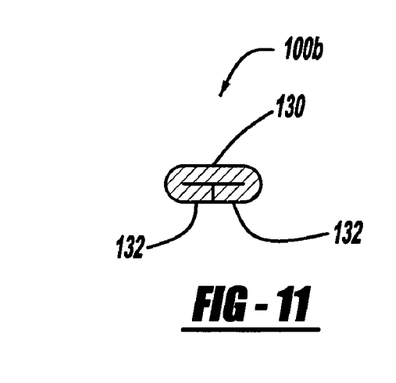
FIG. 11 is a cross-sectional view taken along line 11-11 of FIG. 8.
Figure 12:
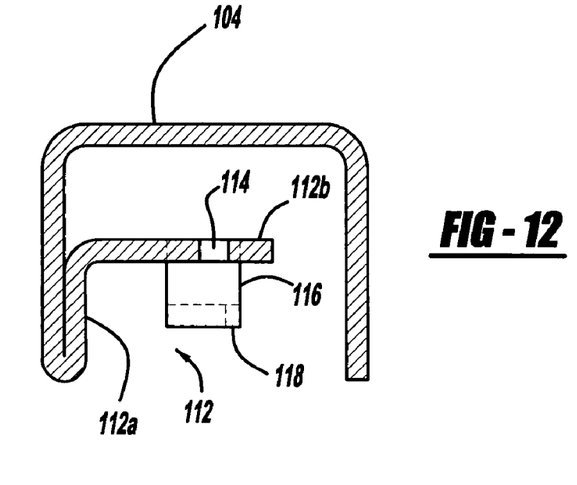
FIG. 12 is a cross-sectional view taken along line 12-12 of FIG. 8.

FIG. 6 is a strip layout of the stages of development of the blank for the retainer and wiper arm as it moves through the various stations within the progressive die which fabricates the one-piece wiper arm. The strip is laid out so that two pieces are carried on either side of the center carrier and from the initial blanking station in the first several stages of the tool the mounting bracket is partially formed upwards. Thereafter, both edge portions of the blank are formed upward at an approximate 90° angle as shown in FIG. 7 in order to create the U-shaped form of the retainer arm. In subsequent stations, the hemming of the arm rod portion of the retainer arm is accomplished in a two stage operation shown in FIGS. 6B and 6C wherein the first stage hems the edges of the blank to approximately a 45° angle which is thereafter finished in the next station to completely hem both edges so that the hemmed edges overlie and are in direct contact with the underlying surface of the underlying material layer as shown in FIGS. 6C and 11. Thereafter, the mounting bracket for the attachment of the spray nozzle is cam formed to its final position shown in FIG. 12 within the two legs of the U-shaped retainer arm in two separate stations. To finalize the completed one piece retainer arm a slot is pierced into the rod end (FIG. 10) which is thereafter cam formed and sized into the hook like end of the rod arm, shown in FIGS. 9 and 10, to enable the hook like end to fit between the cheeks of the support bracket of the wiper blade. In the final stages of the progressive die, the part is separated from the strip so as to present the one piece wiper arm assembly incorporating all the necessary structural elements to provide attachments for the remaining elements of a complete windshield wiper arm assembly.

Figure 8:
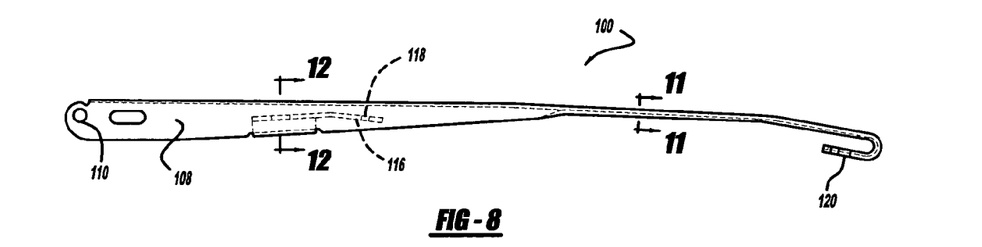
FIG. 8 is a side elevation view of the wiper arm according to the present invention.

The one-piece wiper arm as illustrated in FIGS. 6 through 12 according to the preferred embodiment of the present invention is identified by reference character 100 in bottom plan and side elevational views of FIGS. 7 and 8 respectively. The one-piece wiper arm 100, as earlier described, is formed in a single piece from a blank 100' carried by a strip through a progressive die, with an inner end portion 100a that is formed from the blank 100' by progressively moving through the various stages in the progressive die as earlier described. An outer or distal end portion 100b is developed through the same progressive die by hemming operations as earlier described. The inner end portion 100a of the one-piece wiper arm 100 generally has the configuration of a downwardly facing n with a flat central or bight portion 104 that, when mounted on the vehicle is spaced away from the windshield (not shown) of an associated vehicle in the assembled state of the one-piece wiper arm 100. The inner end portion 100a is formed into a U-shaped configuration having opposed legs 106, 108 extending normally from the flat central or bight portion 104. Axially aligned openings or holes 110 are provided in the legs 106, 108 by which the one-piece wiper arm 100 may be fastened to a mounting head, not shown, similar to the prior art arrangement of FIG. 1. The openings or holes 110 are stamped in the blank 100' formed in the very beginning stations of the progressive sequence as shown in FIG. 1.

One of the legs of the U-channel section, shown in FIG. 2 as leg 106, is provided with extended material from which the mounting bracket is fabricated to enable the attachment of the spray nozzle 28 as well as one end of the tension spring 20 as shown in prior art FIG. 1. As more clearly shown in FIG. 12, the extended material portion or support bracket 112, upon processing through the progressive die, is of generally L-shaped configuration with a leg portion 112a extending back towards the central portion 104 of the U-shaped channel as well as a second leg portion 112b extending from an inner end of the leg portion 112a generally transverse to the leg 106 towards the leg 108 and parallel to the central bight portion 104 but spaced therefrom. The support bracket 112 has an opening 114 by which an end of a coil tension spring (not shown) may be attached to provide tension on the wiper blade (not shown) so as to bias the wiper blade against the windshield. Opposite the opening 114 is a leg extension 116 of the support bracket 112 wherein is formed a detent 118 to enable mounting of the spray head and locking the spray head in place on the support bracket 112 again, similar to the illustration of the prior art in FIG. 1.

As is shown in FIG. 11, the hemmed outer end portion 100b of the one-piece wiper arm 100 is of a double layer construction with the configuration of a C. This outer end portion 100b has a central material layer portion 130 with in-turned material edge portions 132 that extend parallel to the central material layer portion 130, and with no appreciable spacing between the in-turned material edge portions 132 and the central material layer portion 130, the free edges of the in-turned material edge portions 132, which face the windshield of an associated vehicle during the operation of the one-piece wiper arm 100, are touching or in very close proximity to one another. This configuration minimizes the width of the outer end portion 100b, for minimal obstruction to the view of an operator of an associated vehicle. It is of a minimal thickness in a perpendicular direction for a clean, aesthetic appearance and optimum viewing characteristics, and imparts sufficient resistance to deflection under aerodynamic load to maintain an associated wiper blade engagement with a windshield of a vehicle even when the vehicle is traveling at highway speeds. Further, the FIG. 11 configuration can be formed with two hemming operations in the progressive die as shown in FIGS. 6B and 6C. The first operation hems the material at approximately a 45° angle as shown in FIG. 6B. The second stage of hemming completely hems both ends so that the hemmed ends come into complete contact with the central material layer portion 130 and with each other. The hemming operations do not result in any surface irregularities in that portion of the blank 100' and the objectionable noise is not experienced that can result in a wiper arm having external surface cracks when the associated vehicle is traveling at highway speeds.

An outermost end portion 100c of the outer end portion 100b of the one-piece wiper arm 100 is reversely folded by a cam form operation to form the hook end 120 which is spaced from and extends parallel to a portion of the outer end portion 100b that is thereabove. This outermost end portion 100c of the outer end portion 100b is the portion of the one-piece wiper arm 100 that is provided with the opening 126, and the spacing between the outermost end portion 100c and the portion of the outer end portion 100b thereabove provides a clearance for the proper attachment of a wiper blade to the one-piece wiper arm 100 and for the easy removal of the wiper blade when it is required to replace the wiper blade. The progressive die operation final sizes the width of the hook end 120 in order to fit the hook end 120 between the cheeks of the support bracket of the wiper blade.

Although the best mode contemplated by the inventor for carrying out the present invention as of the filing date hereof has been shown and described herein, it will be appreciated by those skilled in the art that suitable modifications, variations, and equivalents be made without departing from the scope of the invention, such scope being limited solely by the terms of the following claims and the legal equivalents thereof.

What is claimed is:

1. A wiper arm for a windshield wiper assembly, said wiper arm being formed in a single piece from a metallic blank and comprising:

an elongated member having:
one end portion being formed by drawing in a progressive die and having a tapered U-shaped configuration with a tapered central portion and a spaced pair of legs extending normally from said tapered central portion, said spaced pair of legs having aligned openings at one end such that said wiper arm may be fastened to an oscillating drive member;
an opposite end portion, defined as substantially the remainder of said elongated member, extending from said one end portion and being formed by hemming defined by a C-shaped cross-section having a constant width bight portion and an opposed pair of edge portions reversely folded onto said bight portion to be in contact with said bight portion, said opposed edges of said edge portions being disposed touching one another and contiguous said bight portion, said C-shaped cross-section having said constant width bight portion being of no more than two thicknesses of said metallic blank from which said wiper arm is formed, said constant width bight portion of said opposite end portion being narrower than a width of said tapered central portion of said one end portion to minimize obstruction to the viewing field of an operator of an associated vehicle when said windshield wiper is in use; and
said elongated member further having a transition portion between said one end portion and said opposite end portion wherein said tapered U-shaped configuration with a tapered central portion and upstanding spaced apart pair of legs extending normally from said tapered central portion is transformed by a hemming operation from said tapered U-shaped configuration into said C-shaped constant width bight portion configuration of said opposite end portion thereby reducing obstruction within the viewing field of an operator of the vehicle when said windshield wiper arm is in use.

2. A wiper arm according to claim 1 wherein an end portion of said opposite end portion of said wiper arm is reversely folded to be spaced from and extend parallel to a portion thereabove, said end portion of said opposite end portion being provided with an opening by which a wiper blade may be attached to, and removed from, said wiper arm.

3. A wiper arm according to claim 1 wherein said metallic blank is a stainless steel blank.

4. A wiper arm according to claim 1 wherein a portion of one of said pair of legs of said one end portion is provided with a generally L-shaped extension, a first leg of said L-shaped extension extending partly back toward said tapered central portion of said one end portion and parallel to said one of said pair of legs of said one end portion, and a second leg extending from said first leg of said L-shaped extension parallel to said tapered central portion of said one end portion, partly toward the other of said pair of legs of said one end portion, said second leg of said L-shaped extension having an opening therein for attachment of an end of a tension spring to maintain said wiper blade carried by said wiper arm in engagement with a windshield of an associated vehicle.

* * * * *